United States Patent
Colaio (10) Patent No.: US 7,341,455 B2
(45) Date of Patent: *Mar. 11, 2008

(54) METHOD AND SYSTEM FOR TRAINING TRADERS

(75) Inventor: Mark Colaio, deceased, late of New York, NY (US); by June Colaio, legal representative, New York, NY (US)

(73) Assignee: Cantor Fitzgerald, L.P., New York, NY (US)

( * ) Notice: Subject to any disclaimer, the term of this patent is extended or adjusted under 35 U.S.C. 154(b) by 124 days.

This patent is subject to a terminal disclaimer.

(21) Appl. No.: 11/097,454

(22) Filed: Apr. 1, 2005

(65) Prior Publication Data

US 2005/0233286 A1    Oct. 20, 2005

Related U.S. Application Data

(63) Continuation of application No. 10/015,739, filed on Dec. 12, 2001, now Pat. No. 6,939,137.

(60) Provisional application No. 60/277,150, filed on Mar. 19, 2001.

(51) Int. Cl.
G09B 11/00        (2006.01)

(52) U.S. Cl. .................... 434/107; 463/9; 273/256; 273/278

(58) Field of Classification Search ............... 434/107, 434/219, 307; 273/256, 258, 278, 147; 436/1, 436/9
See application file for complete search history.

(56) References Cited

U.S. PATENT DOCUMENTS

| | | | |
|---|---|---|---|
| 3,581,077 A | 5/1971 | Damewood et al. | |
| 4,412,287 A | 10/1983 | Braddock, III | |
| 4,588,192 A | 5/1986 | Laborde | |
| 4,674,044 A | 6/1987 | Kalmus et al. | |
| 4,840,382 A * | 6/1989 | Rubin | 463/9 |
| 5,077,665 A | 12/1991 | Silverman et al. | |
| 5,083,800 A * | 1/1992 | Lockton | 463/42 |
| 5,102,143 A | 4/1992 | Winkelman | |

(Continued)

OTHER PUBLICATIONS

Charles Darrow, Monopoly, Parker Brothers Real Estate Trading game, 1934.*

(Continued)

*Primary Examiner*—Robert Pezzuto
*Assistant Examiner*—Sunit Pandya
(74) *Attorney, Agent, or Firm*—Antonio Papageorgiou (57) ABSTRACT

Systems and methods are provided which enable students to participate in a simulated, electronic trading environment. The concept is one where the eSpeed rules based system and GUI may be used to educate students on the trading of financial products. The system may be "live" using real-time information and held either in a private virtual community (i.e. intra-school) or a wider community (i.e. inter-school). Fixed rules may be pre-programmed into the system or modified/customized by the participants. Participants may access the simulation via, for example, the Internet. The products traded in the simulation may include any simulated fixed income financial product. However, the simulation may not involve trading real financial products where there would be real financial risks. Simulated trading may be compared to real-world trading to create new financial products that may be tested and traded in the system.

27 Claims, 6 Drawing Sheets

U.S. PATENT DOCUMENTS

| | | | |
|---|---|---|---|
| 5,270,922 | A | 12/1993 | Higgins |
| 5,297,032 | A | 3/1994 | Trojan et al. |
| 5,689,651 | A | 11/1997 | Lozman |
| 5,713,793 | A * | 2/1998 | Holte .................... 463/25 |
| 5,774,880 | A | 6/1998 | Ginsberg |
| 5,779,549 | A * | 7/1998 | Walker et al. .......... 463/42 |
| 5,809,483 | A | 9/1998 | Broka et al. |
| 5,857,176 | A | 1/1999 | Ginsberg |
| 5,915,209 | A | 6/1999 | Lawrence |
| 5,934,674 | A | 8/1999 | Bukowsky |
| 5,950,176 | A | 9/1999 | Keiser et al. |
| 6,029,146 | A | 2/2000 | Hawkins et al. |
| 6,322,076 | B1 | 11/2001 | Fikki |
| 6,408,263 | B1 * | 6/2002 | Summers .................. 703/6 |
| H2064 | H * | 5/2003 | Buchalter ................ 705/37 |
| 6,634,950 | B2 * | 10/2003 | Yoshimi et al. ......... 463/42 |
| 6,709,330 | B1 * | 3/2004 | Klein et al. ............... 463/9 |
| 2003/0126068 | A1 * | 7/2003 | Hauk et al. .............. 705/37 |

OTHER PUBLICATIONS

Isaac, M. et al., "Price Controls and the Behavior of Auction Markets: An Experimental Examination," American Economic Review, vol. 71, pp. 448-459 (Jun. 1981).

Forsythe, R. et al., "Asset Valuation in an Experimental Market," Econometrica, vol. 50, pp. 537-567 (May 1982).

Plott, C. et al., "Efficiency of Experimental Security Markets with Insider Information: An Application of Rational Expectations Models," Journal of Political Economy, vol. 90, pp. 663-698 (Aug. 1982).

Plott, C., "Externalities and Corrective Policies in Experimental Markets." Economic Journal, vol. 93, pp. 106-127 (Mar. 1983).

Plott, C., "Rational Choice in Experimental Markets." Journal of Business, vol. 59, pp. S301-S327 (Oct. 1986).

Landis, K., "Multi-Talented System Opens Windows for Trader's World," Wall Street Computer Review, pp. 86-93 (Apr. 1988).

Matthew, J., "OTC Success Spurs Specialized Trading Systems," Wall Street Computer Review, pp. 28-38 (Sep. 1989).

Leinweber, D., "Knowledge-Based systems for Financial Applications," IEEE Expert, vol. 3, pp. 18-30 (Fall 1998).

Nöth, M. et al., "Information Aggregation in Experimental Asset Markets: Traps and Misaligned Beliefs," Social Science Working Paper No. 1060. Pasadena: California Institute of Technology (Apr. 1999).

Bossaerts, P. et al., "Basic Principles of Asset Pricing Theory: Evidence from Large-scale Experimental Financial Markets," Social Science Working Paper No. 1070. Pasadena: California Institute of Technology (Feb. 2000).

\* cited by examiner

METHOD AND SYSTEM FOR TRAINING TRADERS

CROSS-REFERENCE TO RELATED APPLICATION

This application is a continuation of U.S. patent application Ser. No. 10/015,739 filed Dec. 12, 2001, now U.S. Pat. No. 6,939,137, issued Sep. 6, 2005, which is hereby incorporated by reference herein in its entirety. This application claims the benefit of U.S. provisional patent application No. 60/277,150, filed Mar. 19, 2001, which is hereby incorporated by reference herein in its entirety.

BACKGROUND OF THE INVENTION

The present invention relates to a method and system for training traders. More particularly, the present invention relates to a method and system that provides students the opportunity to gain valuable skills and experience in trading financial products.

The advent of high-speed networking technologies and the widespread adoption of trading platforms via personal computers, the Internet, wireless and handheld devices, etc., have brought about rapid change and development of the trading function in professional financial services institutions. Such changes include automation of back office operations (i.e. order processing, trade-clearing, etc.) and the creation of new financial instruments made possible with the increased capacity of robust mainframe and supercomputing information systems that model enormous amounts of data.

This widespread utilization of technology has caused traders to place a greater emphasis on strategic decision making, implementing such strategic changes substantially instantaneously from the terminal of a trading desk. Technology has become a fundamental component of the trading profession, and the ability of traders to leverage technology in obtaining, analyzing, synthesizing and reacting to a vast amount of information from a variety of sources is an important cornerstone of a trader's success.

Accordingly, the trading function at any financial institution requires a refined balance of technical know-how and real-world experience that can only be gained through active participation in a market-based financial exchange. While a formalized education might convey the requisite financial and technical skills needed to perform on the job, this method of education does not lend itself toward the latter task of gaining an intimate knowledge of market behavior and a polished acumen for financial transactions. This expertise is essential to the success of any trader and can only be gained through direct experience.

Known systems and methods for training financial traders traditionally include one in which knowledge is passed down directly from one generation of traders to the next through apprenticeships and in-house training programs at brokerage houses, brokers, dealers, broker-dealers and other financial services institutions. Through this method of apprenticeship and direct observation, aspiring traders are able to integrate the experience and expertise of veteran brokers into their own professional practices. This requirement is inconvenient and inefficient, however, in that it requires the presence of a licensed professional trader and, in most cases, individualized attention-resources unavailable in a traditional university learning environment.

SUMMARY OF THE INVENTION

It is therefore an object of the present invention to provide a system and method for training students in the art of trading financial products via an electronically simulated trading environment that enables students to trade simulated financial products—i.e., financial products that have no intrinsic value and, therefore, that have no real-world financial risk—within the simulated market.

It is also an object of the present invention to provide a system and method of training traders through which students actively exchange simulated financial products in a simulated market that responds to, and requires action from, participating students.

It is also an object of the present invention to provide a system and method through which students, using a graphical user interface (GUI), would be able to trade products with no intrinsic value but whose value was determined by participation in the simulated market.

It is also an object of the present invention to provide a system and method that teaches important trading skills to students such as how to obtain, analyze and synthesize critical financial information, react to abrupt changes in market conditions, read and react to market behavior and dynamics, and the perspective with which one must become familiar when participating in a dynamic marketplace.

It is further an object of the present invention to present a GUI that enables participants to receive real-time pricing information (i.e., bid and ask quotes), news stories, SEC filings, etc. The GUI may also provide participants an opportunity to trade directly with other participants in real-time within the same system.

These and other objects of the present invention are achieved by preferably providing rules-based systems and methods to create a simulated financial exchange that may teach students how to trade financial products. The system may contain fixed pre-programmed rules that emulate real markets. Participants may also create their own rules or adjust existing ones to customize the simulated exchange to meet their particular needs. The system may operate on any combination of Local Area Network (LAN), Wide Area Network (WAN), Virtual Private Network (VPN), wireless network, or any available means of communicating information among more than one computing device. The system may relate real-time information between the system and the simulation's participants. Participants may access the system with personal computing devices (PCs), Personal Digital Assistants (PDAs), or any networked computing device via the Internet, a self contained server network, or any means of connecting participating computing devices.

The simulation preferably requires at least one participant and each participant should preferably be registered to participate in the simulation. Each participant may receive an account upon their registration. Participants should not trade real financial products that maintain real financial risk. Rather, the products traded may be simulated financial products that assume the benefits of similar products traded in real markets. Or, the products traded may be real products, but the trades may be fictional and not actually executed.

The implemented method may consist of some method of payment, either a flat participation rate or a fee-per-trade pricing mechanism. All registration fees may be furnished by the participating educational institution(s), corporate sponsor(s), or other source. The registration fees may be pooled to form a winner's jackpot. At the conclusion of the simulation the participant(s) with the highest account value may be awarded an amount from the jackpot to be prespecified by the participants, or administrators, of the closed trading simulation. This amount could be a fixed sum, some percentage of the total per trade fee generated by the participant(s), or any method of measuring and rewarding superior performance.

The system may allow for trading any combination of financial products. Initial pricing of the financial products may be based on the actual fair-market value of the financial products or based on the difference between real market prices and simulated market prices. In the alternative, new products may be created, tested, traded and studied within the closed simulated exchange. Orders may be placed and transactions may be filled based on the similar bid-ask system that governs real financial exchanges; that is buyers 'bid' prices and sellers 'ask' prices for specified financial products on the simulated exchange. A real trading screen or any screen could be provided in real time on the terminal in a window so the students could see how it is working in the real world. One could utilize informational pages, spreadsheets and other information tools and resources in the specified system and method.

Participants may include individuals competing against other individuals, groups of individual participants competing against other groups, a computerized specialist function interacting with at least one other participant, or any combination of groups and individuals competing against each other. An account may be assigned to each individual or group participant. The participants may compete among each other in a private, local community (such as participants within a classroom, academic department or college/school at a single university), or within a larger community (such as between groups at more than one university).

By simulating an interactive and real-time market for products, the present invention provides potential traders with a simulated trading environment similar to the environment of professional traders in real financial exchanges. This simulation improves the professional awareness of potential traders and heightens their understanding of the manner in which financial products and markets behave.

By providing them with such unequivocal experience, students who participate in the simulated training will be better prepared and more intellectually equipped to perform in live markets. In doing so, the system eliminates a significant portion of the training and learning cost associated with trader development. It is the elimination of such costs, traditionally incurred by the new trader's employer, that represents value in implementing the present invention.

BRIEF DESCRIPTION OF THE DRAWINGS

Further features of the invention, its nature and various advantages will become more apparent from the following detailed description of the invention, taken in conjunction with the accompanying drawings, in which like reference characters refer to like parts throughout, and in which.

DETAILED DESCRIPTION OF THE INVENTION

The present invention is now described in connection with FIGS. 1-6.

Figure 1:
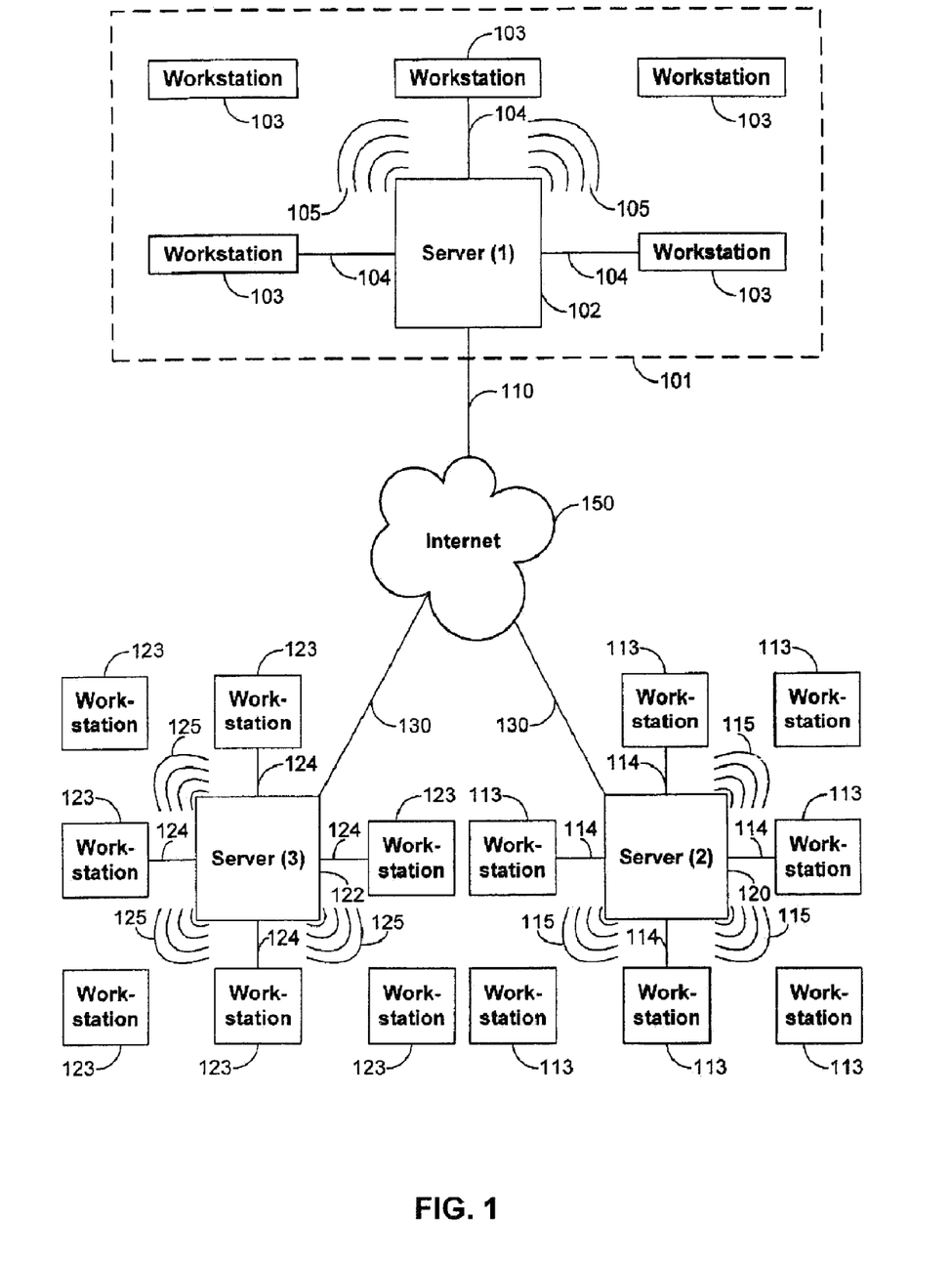
FIG. 1 is a diagram of the information system architecture and configuration of hardware that may be used to implement the present invention.

Turning first to FIG. 1, an example of a systems architecture 100 that may be used to implement one embodiment of the present invention is shown. As illustrated, hardware 100 may include one or more local workstations 103 at a general location connected to one or more servers 102 (i.e. for intra-school competitions) and one or more workstations 113 and 123 at other participating schools connected to one or more local servers 120 and 122 (i.e. for interschool competitions) or any such means available that enables access to the simulated trading environment. Workstations 103, 113 and 123 may include any device suitable for presenting data and, in preferred embodiments of this invention, accepting input. For example, workstations 103, 113 and 123 may be any combination of personal computers, laptop computers, mainframe computers, dumb terminals, data displays, Internet browsers, Personal Digital Assistants (PDAs), two-way pagers, wireless terminals, portable telephones, or any other form of networked personal computing device.

The trading simulator application software is installed on server(s) 102 to create a central repository of information within which the simulation may take place. Multiple wired and wireless connections 104 and 105 may be made between server 102 and workstations 103 and between server 102 and other servers 120 and 122 via the Internet 150 to orchestrate the trading simulation among students using workstations 103, 113 and 123. Workstations 103, 113 and 123 submit and receive commands from server 102. In the case of workstations 113 and 123, gateway servers 120 and 122, or any applicable device, may be used to access and communicate with server 102 via the Internet 150. In alternative embodiments, however, workstations 103, 113 and 123 may communicate with additional hardware and software, enable direct access via the Internet 150 using a centralized Application Service Provider (ASP) or similar service, or may include hardware to orchestrate trading in a distributed fashion without requiring server 102. Server 102, and any additional servers, may consist of any suitable circuitry, devices or programs capable of processing data such as microprocessors, personal computers, network servers, mainframe computers, dedicated computer systems, etc.

As shown, server 102 may be connected to workstations 103, 113, or 123 either directly or via gateway servers 120 and 122, the Internet 150, or each of network devices 104, 105, 110 and 130, and may consist of any suitable data network for communicating data between workstations 103, 113 and 123, such as any combination of a local area network, a wide area network, the Internet, an intranet, a wireless network, a hard wired connection, a dial-up network, a virtual private network, or any available method of connecting multiple workstations.

When used to implement a bid/offer trading simulation for training traders within a single or across multiple networks as described above, hardware 100 may enable a participant to submit a bid to buy or offer to sell an item at one of workstations 103, 113 and 123. This bid or offer may then be communicated to server 102, where the bid or offer can be ranked and stored in a bid-offer queue. The ranking may be based upon time of submission, price, or any other suitable criterion. The bid or offer may then be presented to other traders via other workstations 103, 113 and 123 dependent upon its ranking in the bid-offer queue. Once displayed, the bid or offer can then be hit or taken, respectively, by one or more of the other traders so that a trade of the item can proceed to execution.

Figure 2:
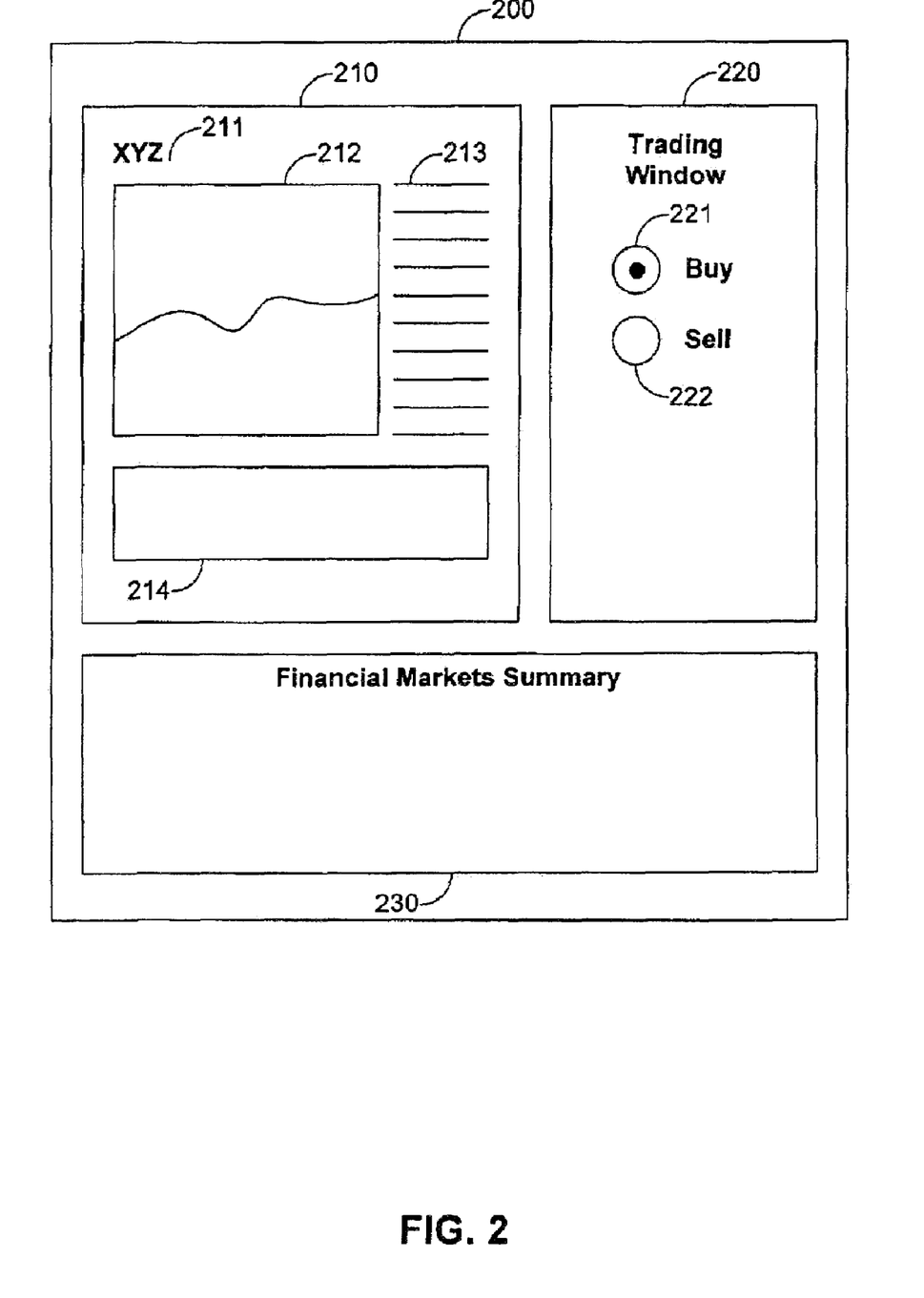
FIG. 2 is an illustration of a full-screen GUI display that may be presented in accordance with one embodiment of the present invention.

FIG. 2 shows an example of a Graphical User Interface (GUI) 200 for presenting the functionality and information pertaining to the present invention and to be used by participants via workstations 103, 113 and 123. As illustrated, simulated and actual financial information is presented via a financial information window 210 which may include charts, graphs, tables, spreadsheets or any medium of presenting detailed financial information about any particular financial product traded in the simulation. The financial information window 210 may include ticker symbol 211 or other means to properly identify the specified financial product, graph 212 relating price history, volatility, or any pertinent information regarding the financial product, table 213 containing current price, bid and ask quotes, daily volume and any other real-time decision making information as specified by a user, and footer 214 which may contain the bid-offer queue for the specified issue as well as the ability to access more detailed information about the company and/or financial product.

GUI 200 also includes an interactive trading window 220 (discussed in greater detail in FIG. 3) containing methods to 'Buy' 221 and 'Sell' 222 financial products. Each method consists of input fields that the user may complete as well as an execute function that the user may trigger to complete a transaction.

Also included in GUI 200 is a financial markets window 230 consisting of a table of real time news stories concerning financial markets which may include new stories, SEC filings, index quotes or any pertinent information as specified by the user. In accordance with the present invention, these portions of GUI 200 enable students to acquire trading finesse and sound trading judgment through the ability to assimilate and analyze real time financial information quickly for the purpose of making sound, assertive and responsible financial decisions based on dynamic, constantly-changing market conditions.

Figure 3:
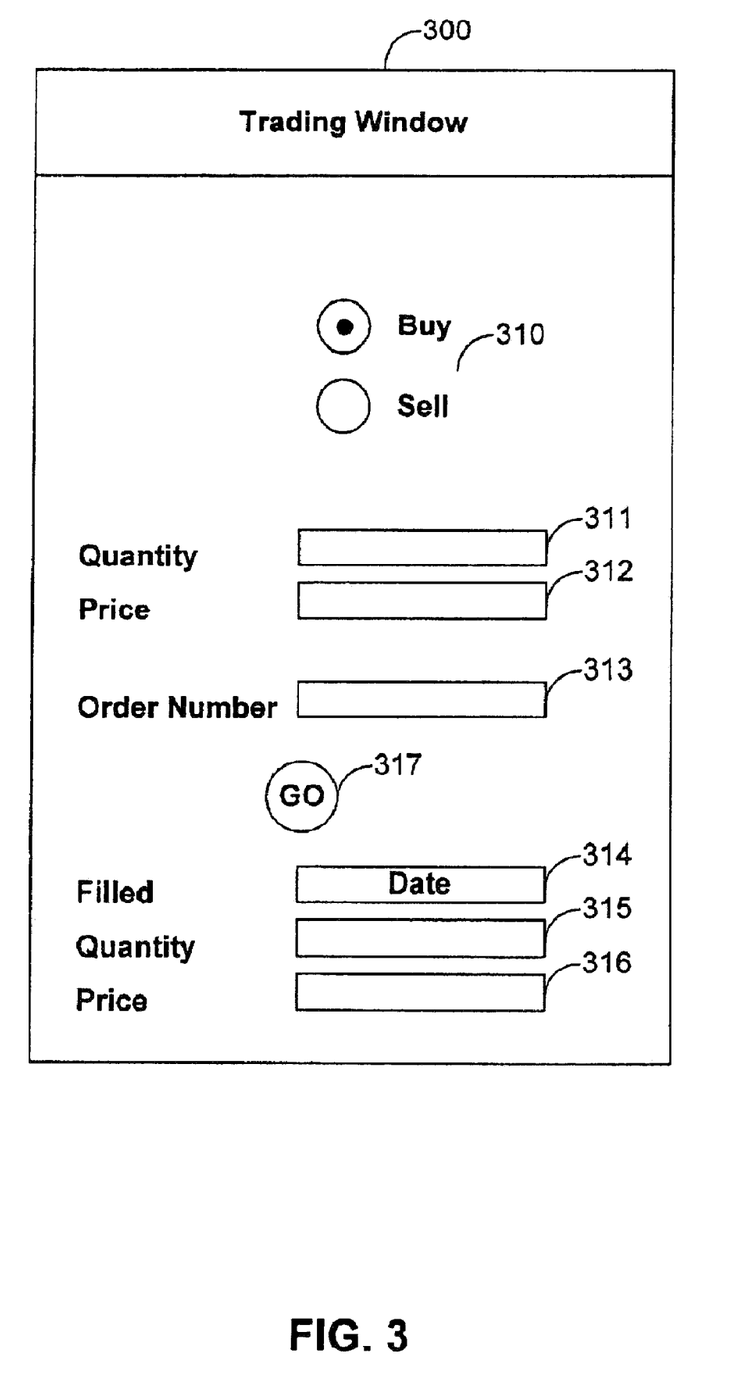
FIG. 3 is a closer illustration of the trading window display shown in FIG. 2 that may be presented in accordance with one embodiment of the present invention.

Turning to FIG. 3, an interface 300 is shown as one embodiment of the system used to submit buy and sell orders within the trading simulation in accordance with the present invention. To buy or sell a financial product in the training simulation the user may select the type of transaction they wish to complete 310, enter information in the number of shares to purchase field 311, enter a per share dollar value for the bid or offer limit in field 312, and execute the transaction, in the present embodiment by employing a device similar to 'Go' button 317. An order number 313 may then be issued by the system to track the order. When the order is filled, a time stamp, actual shares traded and price per share may fill fields 314, 315 and 316, respectively, and become part of the record associated with that order number. Interface 300 may be presented on a trader's workstation and information may be retrieved and/or inserted using any variety of input/output device.

Figure 4:
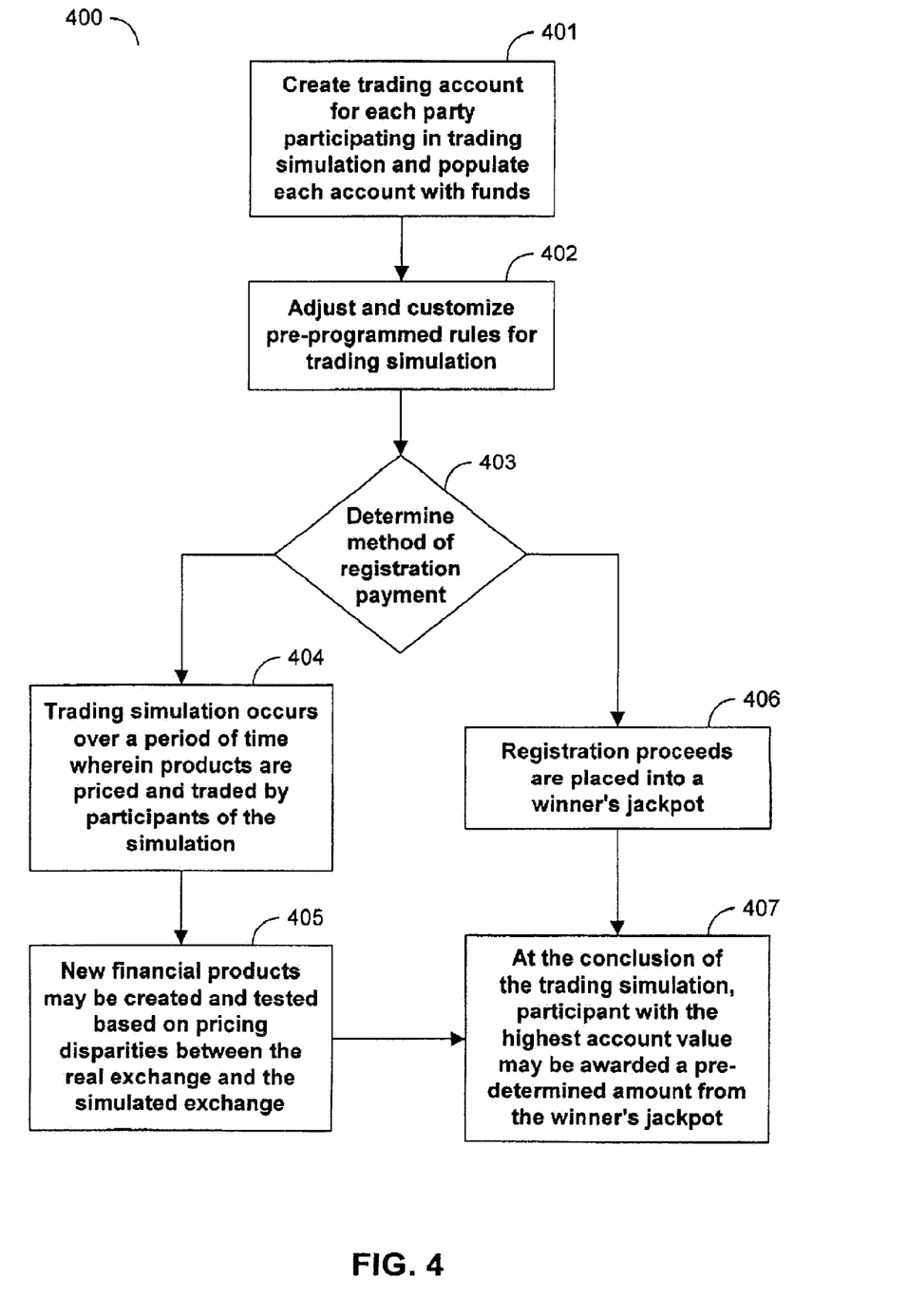
FIG. 4 is a flow diagram illustrating the process for implementing one embodiment of the method and system specified by the present invention.

Turning to FIG. 4, a process 400 for implementing the simulated trading environment in accordance with one embodiment of the present invention is shown. As illustrated at step 401, process 400 first allows the administrators of the trading simulation to create accounts for each group or individual participant. The accounts are then populated with an appropriate amount of funds to properly gauge the growth of the account over the specified time period. Funds may include cash, product, or any medium of exchange determined in step 402.

The next step 402 specifies that the participants adjust and/or customize the body of rules that govern financial transactions in the simulated trading environment. While each simulation may employ its own variation of the pre-programmed rules (as determined by all or selected participants), this customization may be performed centrally with any input/output device so that the same rules apply to all participants in the simulation.

Process 400 next specifies that each participant pay a fee for use of the trading simulation in step 403. This fee may be a fixed flat rate for participation, a fee-per-trade for each trade placed within the simulated exchange, or any method as specified by the participants in step 402. The fee may be paid for by a pre-determined body such as a university, corporate sponsor, or any benefactor.

In step 406, the registration fees may be pooled together and placed in a winners jackpot to be properly distributed at the conclusion of the trading simulation in step 407.

Process 400 then specifies for the trading simulation to take place in step 404. During a time period specified in step 402 participants may research, buy and sell products in a simulated trading environment. Products may include fixed income financial products such as treasuries, agencies, mortgages, swaps, REPOs, corporates, etc. These instruments may initially be priced according to their real market value, according to a price pre-determined by the simulation's participants in step 402, or otherwise determined by participants of the simulation.

Figure 6:
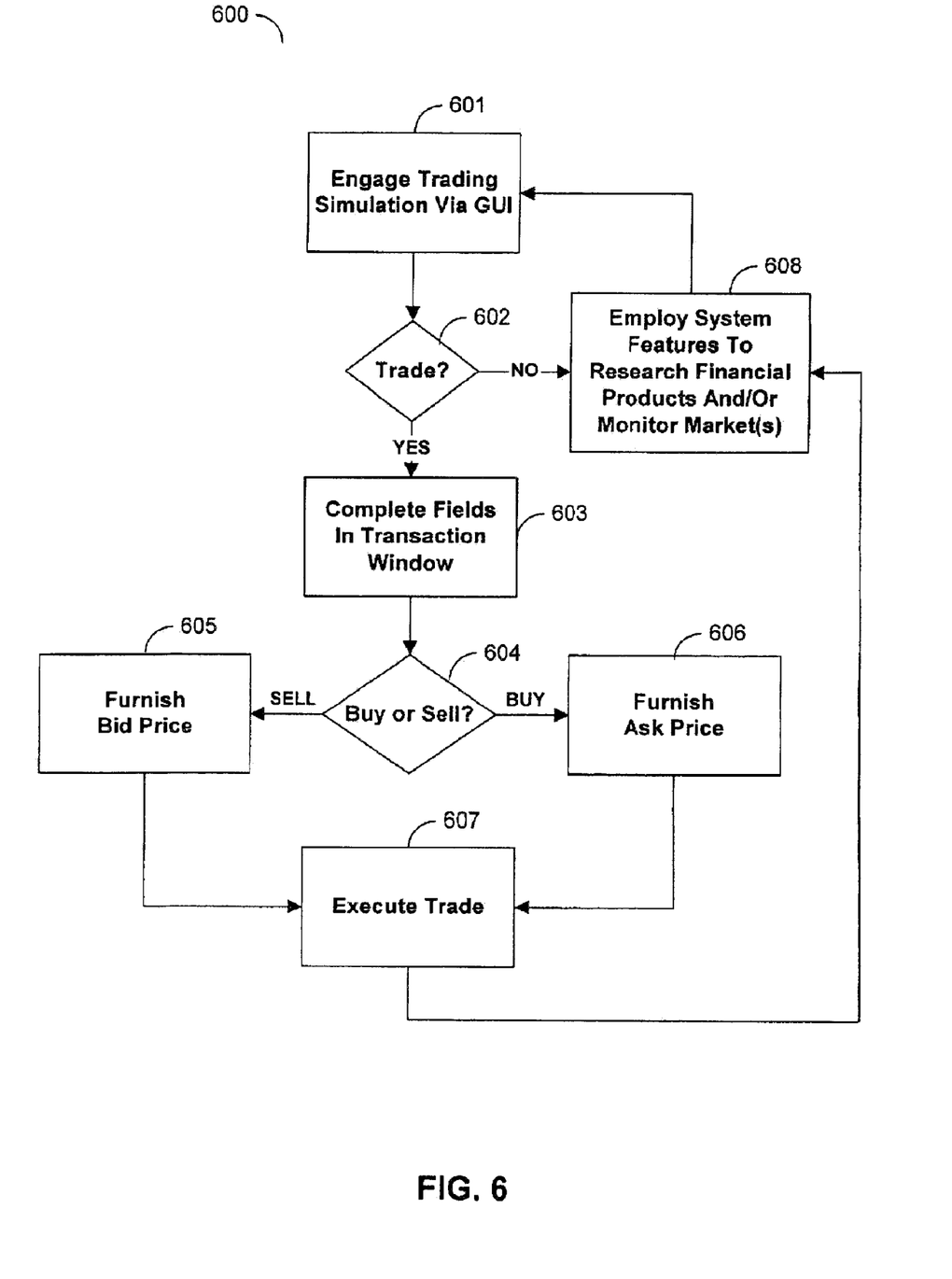
FIG. 6 is a Process Flow Diagram illustrating a method to engage and employ the GUI to make transactions and participate in the simulated financial exchange as specified by one embodiment of the system and method of the present invention.

Once trading commences within the simulated exchange, products may be priced at the simulated market value, with buyers and sellers in the simulation specifying ask and bid limits to price the products. A more detailed example for processing bids and offers that may be executed in server 102 (FIG. 1) in accordance with one embodiment of the present invention is depicted in process 600 (FIG. 6).

Turning back to FIG. 4, process 400 next specifies the creation and testing of new financial products 405 in the simulated market based on the spread differentials and arbitrage opportunities that may arise from disparities between the simulated market and an actual market. Such products may behave as derivatives of the simulated market, offering participants an opportunity to learn how such products are traded in an open market and how their behavior may be gauged in relation to the base-market.

The final step of process 400, step 407, requires the dispersal of a financial reward to the winner of the simulation in step 404. The winner may be the group or individual participant with the highest account value at the end of the simulation, or any other method of determining the winner as specified in step 402. The declared winner may be awarded any amount of the fees allocated to the winner's jackpot in step 406 as determined by the participants in step 402.

Figure 5:
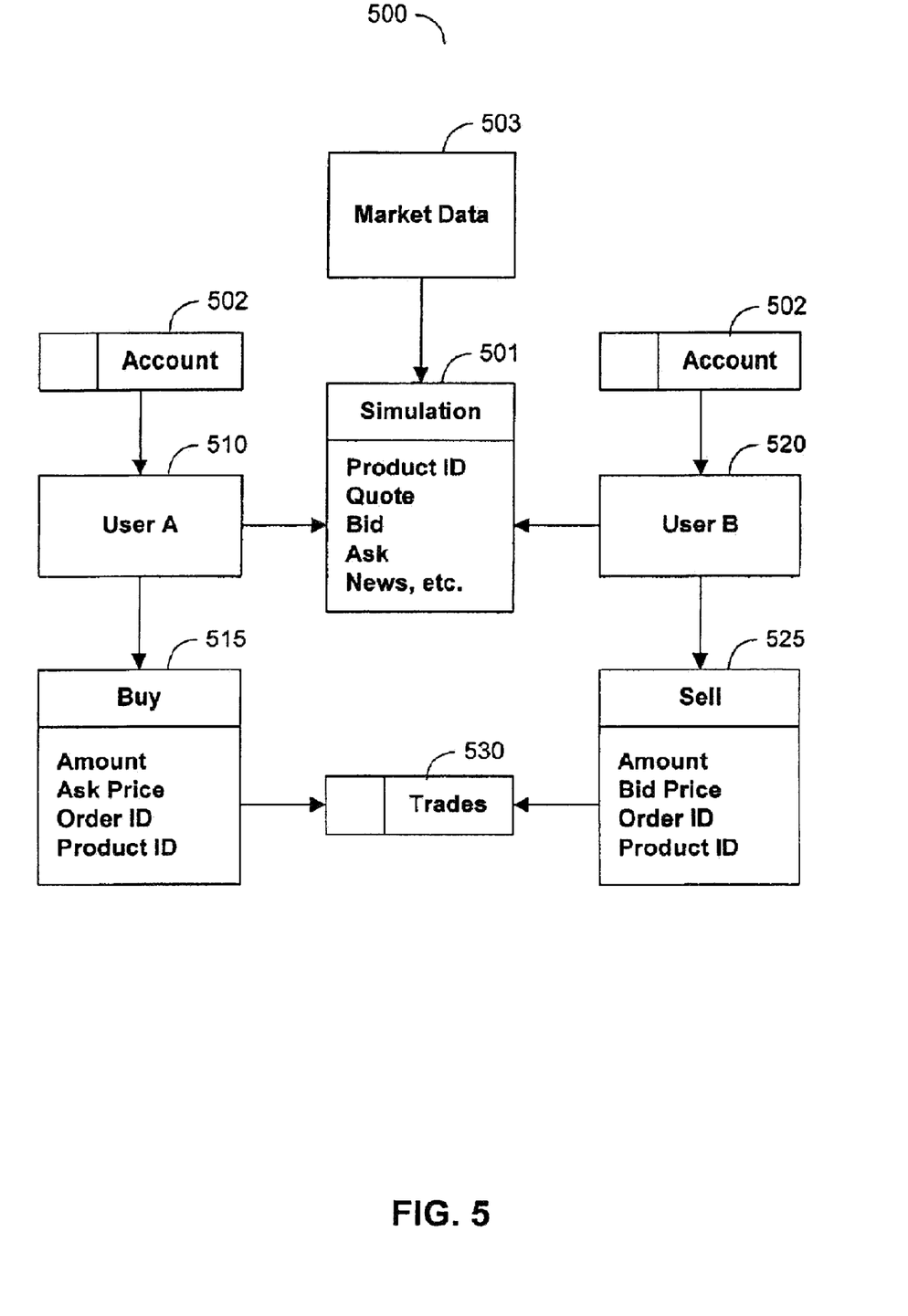
FIG. 5 is a Data Flow Diagram (DFD) of the information transacted during a simulated trade taking placing as specified by one embodiment of the system and method of the present invention.

Turning to FIG. 5, one embodiment of the flow of data and processes for implementing the present invention is shown in Data Flow Diagram (DFD) 500. DFD 500 specifies simulation 501 as the central process in the system, consisting of inputs from User Account Data 510 and 520, a Real Market Data Source 503 and simulated market data from Trades Data Store 530. User A 510 and User B 520, defined by records specified in Account Data Store 502, place orders via Buy 515 and Sell 525 processes depicted in DFD 500. The process for engaging the GUI for the purpose of placing such trades is further depicted in process 600 (see FIG. 6).

Turning back to FIG. 5, upon completing steps 510 and/or 515 of process 500, orders are placed in Trades Data Store 530. The bid/ask information is then relayed to the simulation and can be viewed via the financial information window 210 depicted as part of GUI 200 (see FIG. 2).

Turning back to FIG. 5, once trades are accepted by matching the bid/ask with a respective ask/bid from counterparties participating in the simulation, the orders are marked as filled from Trade Data Store 530 and removed from the queue. The user's account information is also updated with the transaction information in Account Data Store 502. Real-time information regarding most recent trades constantly update the simulation to provide users with the look and feel of a dynamic and interactive trading environment.

Turning to FIG. 6, one embodiment of a process that may be implemented for employing the GUI to engage the simulation is shown in Process Flow Diagram (PFD) 600. PFD 600 specifies that the user engage the trading simulation in step 601. Decision Point 602 then determines whether or not a trade may take place. If a trade does not take place, the user may continue to engage the system for the purpose of researching financial products and/or monitoring markets 608. If the user desires to place a trade, the user may complete the necessary fields of the transaction window 603. The user will then be prompted to determine the type of transaction by way of the buy or sell decision point 604. If the users elects for a sell transaction, a bid price must be furnished in the trading window in step 605. If the user elects a buy transaction, an ask price must be furnished in the trading window in step 606. When all appropriate information required by the trading window is furnished by the user, the trade is then executed in step 607. Once the trade is executed, the user may once again return to employing the GUI to engage the system for research 608 and trading 601 purposes.

Those skilled in the art will appreciate that the present invention can be practiced by other than the described embodiments, which are presented for purposes of illustration and not of limitation, and the present invention is limited only by the claims.

What is claimed is:

1. A method comprising:
    assigning an amount of a simulated fixed income product to at least a first trader in a closed exchange, the closed exchange operating over a period of time simulating a real-time market for the simulated fixed income product;
    assigning an amount of simulated funds to at least a second trader in the closed exchange;
    receiving at least one order for the simulated fixed income product from one of the first trader and the second trader, wherein the first and the second traders are in communication with each other over a computer network;
    causing an interface screen to be displayed at least one workstation associated with a trader, the interface screen comprising at least one item of information from the simulated market and at least one item of information from an actual market;
    receiving at least one counter order for the simulated fixed income product from the other of the one of the first trader and the second trader; and
    executing at least one trade between the first trader and the second trader for the simulated fixed income product at a price specified by at least one of the traders and for an amount of simulated funds determined based on the price, wherein the price of the at least one executed trade reflects a market price for the simulated fixed income product in the simulated market.

2. The method of claim 1, wherein the amount of simulated funds assigned to the second trader is based on the period of time for simulated trading in the closed exchange.

3. The method of claim 2, wherein the period of time is specified by at least one of the traders.

4. The method of claim 1, further comprising requiring a registration fee for participation in the simulation.

5. The method of claim 4, further comprising applying the registration fee as a lump sum payment.

6. The method of claim 4, further comprising applying the registration fee on a per trade basis.

7. The method of claim 6, further comprising allocating a percentage of the registration fee to a winner's jackpot.

8. The method of claim 7, further comprising allowing the traders to determine the percentage.

9. The method of claim 7, wherein each trader has an account with an account value, and wherein, at the completion of the simulation, the trader with the highest account value is awarded the winner's jackpot.

10. The method of claim 1, wherein trading in the closed exchange is performed based on at least one rule customized by at least one of the traders.

11. The method of claim 10, wherein the at least one rule sets the period of time for simulated trading.

12. The method of claim 1, wherein the traders are associated with at least one group of individuals competing in the closed exchange against at least one other group of individuals.

13. The method of claim 1, further comprising trading bonds as the simulated fixed income product.

14. The method of claim 1, further comprising trading corporates as the simulated fixed income product.

15. The method of claim 1, further comprising trading treasuries as the simulated fixed income product.

16. The method of claim 1, further comprising trading swaps as the simulated fixed income product.

17. The method of claim 1, further comprising trading REPOs as the simulated fixed income product.

18. The method of claim 1, further comprising trading mortgages as the simulated fixed income product.

19. The method of claim 1, further comprising creating a derivative product based at least on pricing disparities between the simulated market and an actual market.

20. The method of claim 19, comprising trading the derivative product in the closed exchange.

21. The method of claim 1, wherein the at least one item of information from the simulated market comprises a price history of the simulated fixed income product in the simulated market.

22. The method of claim 21, wherein the price history is presented in at least one form selected from the group consisting of a chart, a graph, a table, and a spreadsheet.

23. The method of claim 1, wherein the at least one item of information from the simulated market comprises a bid-offer queue for the simulated fixed income product.

24. The method of claim 1, wherein the at least one item of information from the simulated market comprises a then current price for the simulated fixed income product in the simulated market.

25. The method of claim 24, wherein the at least one item of information from the actual market comprises a price history of the simulated fixed income product in the actual market.

26. The method of claim 25, wherein the price history is presented in at least one form selected from the group consisting of a chart, a graph, a table, and a spreadsheet.

27. The method of claim 24, wherein the at least one item of information from the actual market comprises a then current price for the simulated fixed income product in the actual market.

* * * * *